3,024,278
CHEMICAL PROCESS
Leo C. D. Groenweghe, St. Louis, Mo., assignor to Monsanto Chemical Company, St. Louis, Mo., a corporation of Delaware
No Drawing. Filed Oct. 1, 1959, Ser. No. 843,618
5 Claims. (Cl. 260—543)

This invention relates to dethionation of thionophosphonic dihalides, i.e., the conversion of the quadruply substituted phosphorus compounds to the corresponding triply substituted phosphorus compounds by removal of the thiono sulfur atom.

In the past, in order to dethionate thionophosphorus compounds of the general type dealt with herein, it has been necessary to utilize expensive and difficultly obtainable dethionating compounds. For example, in order to remove the thiono sulfur atom from chloromethylthionophosphonic dichloride it has been necessary to react that compound with phenyldichlorophosphine to give the dethionated compound chloromethyldichlorophosphine and the by-product phenylthionophosphonic dichloride. From the following description it can be readily seen that the present invention provides a far simpler method for dethionating such compounds.

According to the present invention, dethionation of thionophosphonic dihalides is effected by reaction with elemental reducing agents. Examples of such elemental reducing agents are Mg, Ca, Sr, Ba, Ti, Zr, V, Mn, Fe, Co, Ni, Cu, Zn, Cd, Hg, Al, P, As, Sb, Bi, and $H_2$ (especially when catalyzed, for example, with nickel, palladium, or platinum).

The present reaction is readily carried out simply by heating the thionophosphonic dihalide and the elemental reducing agent together. Reaction takes place according to the following equation:

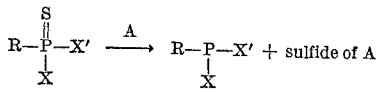

wherein R is an organic radical attached to the phosphorus atom through a carbon/phosphorus bond, X and X' are halogen atoms (particularly Cl, Br, or F), either the same or different, and A is an elemental reducing agent.

The proportion of elemental reducing agent utilized according to the present invention should be at least sufficient to combine (on a stoichiometric basis) with all of the thiono sulfur in the thionophosphonic dihalide, while forming a sulfide of the elemental reducing agent. An excess of reducing agent over the foregoing amount is not detrimental.

In order to have the reaction take place at reasonably rapid rates, it is preferably carried out at somewhat elevated temperatures—for example, above about 80° C., and preferably above about 120° C. The only upper limitations upon the reaction temperature are ones imposed by virtue of potential decomposition of the reactants or products at extremely high temperatures. Such decomposition temperatures will vary with the particular radicals or groups present on the specific compounds utilized or produced. Also, it is advisable to avoid extremely high temperatures with some of the very reactive reducing agents, in order to minimize side reactions between the reducing agent and the halogen atoms of the thionophosphonic dihalides. In most cases adequate reaction rates are obtained without substantial decomposition or side reactions at temperatures between about 100° C. and about 400° C., and preferably between about 140° C. and about 300° C.

The above-described reaction is applicable generally to all thionophosphonic dihalides, i.e., thiono compounds of the type indicated in the foregoing equation in which R is an organic radical attached to the phosphorus with a carbon/phosphorus bond. Such organic radicals can be either unsubstituted hydrocarbyl radicals or substituted hydrocarbyl radicals. The radicals may be either aliphatic or cyclic, the latter being either aromatic or alicyclic. Typical suitable examples of the foregoing are as follows:

A. UNSUBSTITUTED HYDROCARBYL

| | |
|---|---|
| Ethyl | Phenyl |
| i-Propyl | Cresyl |
| 2-ethylhexyl | Ethylphenyl |
| n-Dodecyl | Xylyl |
| Stearyl | t-Butylphenyl |
| Propenyl | n-Dodecylphenyl |
| Oleyl | Naphthyl |
| Cyclohexyl | Benzyl |
| Cyclopentadienyl | Indanyl |

B. SUBSTITUTED HYDROCARBYL

| | |
|---|---|
| β-Chloroethyl | p-Bromophenyl |
| γ-Methoxypropyl | p-(N-dimethylamino)phenyl |
| β-Sulfinoethyl | 2-furyl |
| N-ethyl-p-isoxazinyl | 2-fluoroindenyl |

Further details with respect to practicing the present invention will be readily apparent from the following examples, which represent several specific modes contemplated for carrying out the invention.

Example 1
DETHIONATION OF METHYLTHIONOPHOSPHONIC DICHLORIDE WITH MERCURY

A mixture of 14.3 grams of mercury and 10.4 grams of methylthionophosphonic dichloride was heated in an agitated sealed glass tube for 66 hours at 140° C. to give about a 20% yield of methyldichlorophosphine along with mercuric sulfide by-product. The remainder of the reaction mass was unreacted raw material, so that 100% conversion of reactants can readily be obtained by repeatedly withdrawing the products and continuing the reaction with the remaining reactants.

Example 2
DETHIONATION OF METHYLTHIONOPHOSPHONIC DICHLORIDE WITH ZINC

The procedure and results of Example 1 were substantially duplicated with a mixture of 4.9 grams of zinc dust and 10.8 grams of methylthionophosphonic dichloride.

Example 3
DETHIONATION OF METHYLTHIONOPHOSPHONIC DICHLORIDE WITH PHOSPHORUS

A mixture of 1.11 grams of elemental white phosphorus and 8.0 grams of methylthionophosphonic dichloride was heated in an agitated sealed glass tube for 65 hours at 200° C. to give better than a 20% yield (based on phosphorus) of methyldichlorophosphine.

Example 4
DETHIONATION OF PHENYLTHIONOPHOSPHONIC DICHLORIDE WITH PHOSPHORUS

A mixture of 1.35 grams of elemental white phosphorus and 9.2 grams of phenylthionophosphonic dichloride was heated in an agitated sealed glass tube for 65 hours at 200° C. to give a 15% yield of phenyldichlorophosphine.

What is claimed is:
1. The method of dethionating a thionophosphonic dihalide which comprises heating said dihalide to a temperature above about 80° C. with an elemental reducing agent selected from the group consisting of $H_2$, Mg, Ca, Sr, Ba, Ti, Zr, V, Mn, Fe, Co, Ni, Cu, Zn, Cd, Hg, Al, P, As,

Sb and Bi, thereby converting said thionophosphonic dihalide to the corresponding dihalophosphine.

2. The method of dethionating a thionophosphonic dichloride which comprises heating said dichloride to a temperature above about 80° C. with an elemental reducing agent selected from the group consisting of $H_2$, Mg, Ca, Sr, Ba, Ti, Zr, V, Mn, Fe, Co, Ni, Cu, Zn, Cd, Hg, Al, P, As, Sb, and Bi, thereby converting said thionophosphonic dichloride to the corresponding dichlorophosphine.

3. The method of dethionating an alkylthionophosphonic dichloride which comprises heating said dichloride to a temperature above about 120° C. with elemental zinc, thereby converting said alkylthionophosphonic dichloride to the corresponding alkyldichlorophosphine.

4. The method of dethionating an alkylthionophosphonic dichloride which comprises heating said dichloride to a temperature above about 120° C. with elemental mercury, thereby converting said alkylthionophosphonic dichloride to the corresponding alkyldichlorophosphine.

5. The method of dethionating a thionophosphonic dichloride which comprises heating said dichloride to a temperature above about 120° C. with elemental white phosphorus, thereby converting said thionophosphonic dichloride to the corresponding dichlorophosphine.

References Cited in the file of this patent

Collie, R., et al.: J. Chem. Soc., 107, 367 (1915).
Kosolapoff: Organo-Phosphorus Compounds (1950), page 112.